United States Patent
Tokai

(10) Patent No.: US 9,254,836 B2
(45) Date of Patent: Feb. 9, 2016

(54) VEHICLE CONTROL DEVICE

(75) Inventor: Norihiko Tokai, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 102 days.

(21) Appl. No.: 14/233,483

(22) PCT Filed: Jul. 20, 2011

(86) PCT No.: PCT/JP2011/066468
§ 371 (c)(1),
(2), (4) Date: Feb. 4, 2014

(87) PCT Pub. No.: WO2013/011579
PCT Pub. Date: Jan. 24, 2013

(65) Prior Publication Data
US 2014/0163802 A1     Jun. 12, 2014

(51) Int. Cl.
*B60W 10/00*   (2006.01)
*B60W 20/00*   (2006.01)
*F16H 61/14*   (2006.01)
*B60W 10/02*   (2006.01)
(Continued)

(52) U.S. Cl.
CPC .......... *B60W 20/108* (2013.01); *B60W 10/026* (2013.01); *B60W 10/06* (2013.01); *B60W 10/08* (2013.01); *F16H 61/14* (2013.01); *Y02T 10/6286* (2013.01); *Y10S 903/93* (2013.01); *Y10S 903/946* (2013.01)

(58) Field of Classification Search
CPC ... B60W 10/06; B60W 10/08; B60W 10/026; Y10S 903/93; Y10S 903/946
See application file for complete search history.

(56) References Cited

U.S. PATENT DOCUMENTS 5,569,117 A * 10/1996 Kono et al. .................... 477/169
5,588,937 A * 12/1996 Kono et al. .................... 477/169
(Continued)

FOREIGN PATENT DOCUMENTS

JP   2000-318492 A   11/2000
JP   2001-032922 A    2/2001
(Continued)

*Primary Examiner* — Truc M Do
(74) *Attorney, Agent, or Firm* — Kenyon & Kenyon LLP

(57) ABSTRACT

A control device of a vehicle provided with an engine, and a fluid-operated power transmitting device provided with a lock-up clutch and configured to transmit a drive force of said engine to drive wheels, and an engine connecting/disconnecting clutch configured to selectively place a power transmitting path between said engine and said fluid-operated power transmitting device in a power transmitting state and a power cutoff state, said vehicle being able to run in an engine drive mode in which said engine is operated as a vehicle drive power source while said engine connecting/disconnecting clutch is placed in a fully engaged state, comprising: a lock-up clutch control portion configured to bring said engine connecting/disconnecting clutch from the fully engaged state into a slipping state and temporarily place the engine connecting/disconnecting clutch in the slipping state while said lock-up clutch is placed in a slipping state, when a lock-up slip control is implemented to place said lock-up clutch from a fully released state into the slipping slip and gradually bring the lock-up clutch into a fully engaged state, in response to an increase of a required amount of acceleration of said vehicle, during running of the vehicle in said engine drive mode with said engine connecting/disconnecting clutch being placed in the fully engaged state.

5 Claims, 4 Drawing Sheets

(51) Int. Cl.
  *B60W 10/06* (2006.01)
  *B60W 10/08* (2006.01)

(56) References Cited

U.S. PATENT DOCUMENTS

| | | | |
|---|---|---|---|
| 5,611,750 A * | 3/1997 | Kono et al. | 477/65 |
| 5,865,709 A * | 2/1999 | Tamura et al. | 477/181 |
| 6,524,217 B1 * | 2/2003 | Murakami et al. | 477/5 |
| 2002/0006848 A1 * | 1/2002 | Tabata | 477/32 |
| 2002/0052265 A1 * | 5/2002 | Segawa et al. | 477/62 |
| 2002/0116099 A1 * | 8/2002 | Tabata et al. | 701/22 |
| 2002/0147071 A1 * | 10/2002 | Hayabuchi et al. | 477/68 |
| 2003/0036458 A1 * | 2/2003 | Tabata et al. | 477/107 |
| 2003/0203790 A1 * | 10/2003 | Matsubara et al. | 477/107 |
| 2004/0111203 A1 * | 6/2004 | Higashimata et al. | 701/51 |
| 2004/0157705 A1 * | 8/2004 | Nobumoto et al. | 477/174 |
| 2005/0245349 A1 * | 11/2005 | Tabata et al. | 477/3 |
| 2007/0056784 A1 * | 3/2007 | Joe et al. | 180/65.2 |
| 2007/0142174 A1 | 6/2007 | Swank et al. | |
| 2007/0186981 A1 * | 8/2007 | Fukushima et al. | 137/339 |
| 2008/0058154 A1 * | 3/2008 | Ashizawa et al. | 477/5 |
| 2008/0271966 A1 * | 11/2008 | Simpson et al. | 192/3.33 |
| 2009/0020384 A1 * | 1/2009 | Gooden et al. | 192/3.3 |
| 2009/0139818 A1 * | 6/2009 | Ishikawa et al. | 192/3.29 |
| 2009/0143189 A1 * | 6/2009 | Hasegawa et al. | 477/5 |
| 2009/0280950 A1 * | 11/2009 | Michishita et al. | 477/3 |
| 2010/0174429 A1 * | 7/2010 | Hase et al. | 701/22 |
| 2011/0039655 A1 * | 2/2011 | Kaltenbach et al. | 477/5 |
| 2011/0239801 A1 * | 10/2011 | Inagaki et al. | 74/473.1 |

FOREIGN PATENT DOCUMENTS

| | | |
|---|---|---|
| JP | 2004-019812 A | 1/2004 |
| JP | 2004-263733 A | 9/2004 |
| JP | 2005-016563 A | 1/2005 |
| JP | 2006-306207 A | 11/2006 |
| JP | 2006-306209 A | 11/2006 |
| JP | 2007-170664 A | 7/2007 |

* cited by examiner

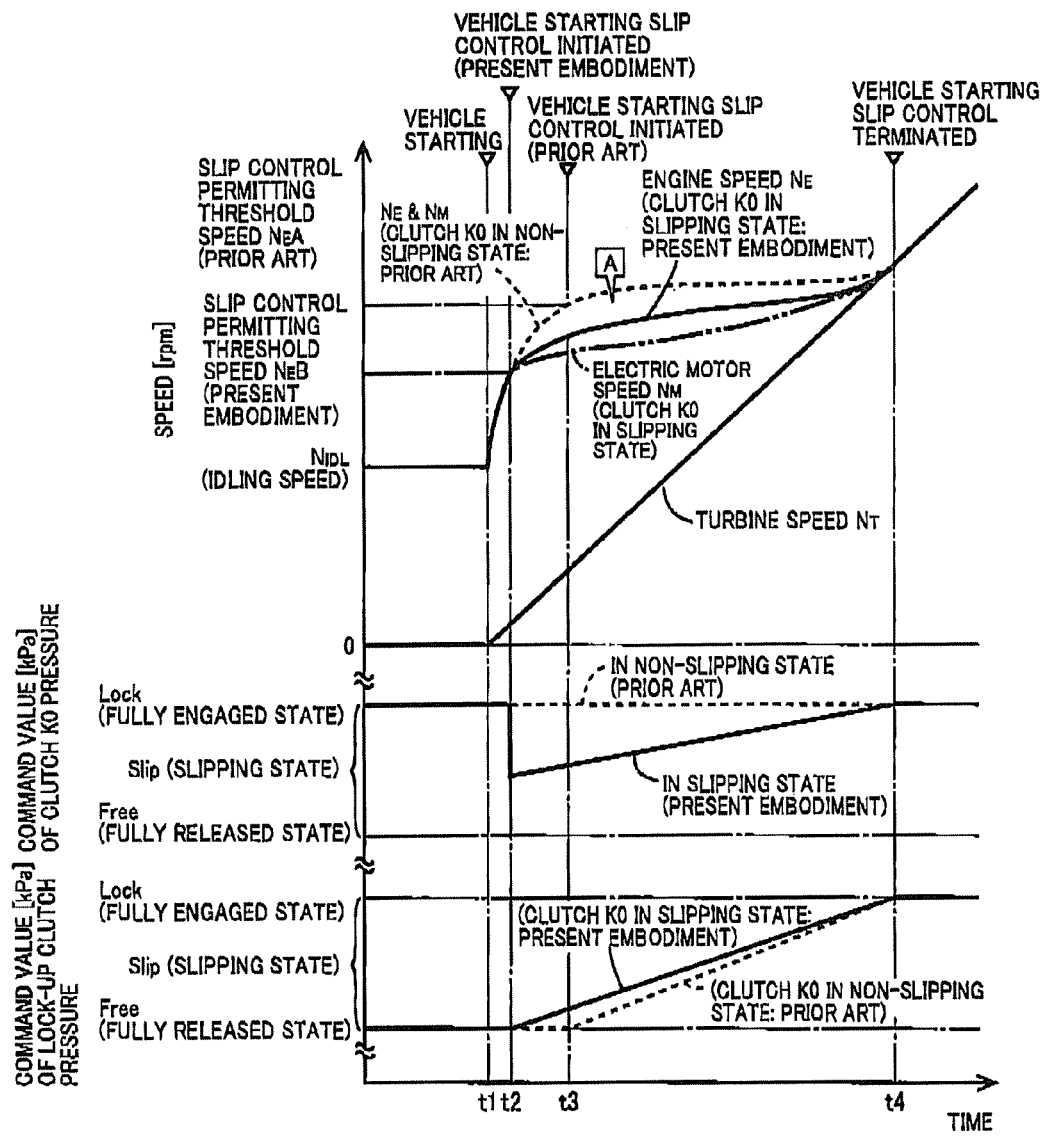

VEHICLE CONTROL DEVICE

CROSS-REFERENCE TO RELATED APPLICATIONS

This is a national phase application based on the PCT International Patent Application No. PCT/JP2011/066468 filed on Jul. 20, 2011, the entire contents of which are incorporated herein by reference.

TECHNICAL FIELD

The present invention relates to a control device of a vehicle provided with an engine, and a fluid-operated power transmitting device which is provided with a lock-up clutch and which is configured to transmit a drive force received from the engine through an engine connecting/disconnecting clutch, to drive wheels of the vehicle.

BACKGROUND ART

There is well known a vehicle provided with a fluid-operated power transmitting device provided with a lock-up clutch and configured to transmit a drive force of an engine to drive wheels. Patent Document 1 discloses an example of such a vehicle. The above-indicated lock-up clutch is generally commanded to be selectively placed in its engaged and released states, on the basis of a running state of the vehicle and according to a relationship predetermined for the purpose of improving fuel economy of the vehicle. For example, a lock-up control of the lock-up clutch is initiated when the running state of the vehicle falls within a lock-up control region. Further, the lock-up control region can be enlarged to improve the fuel economy, by implementing a slip control of the lock-up clutch (a lock-up slip control or flexible lock-up control) wherein the lock-up clutch is given a suitable amount of slipping on the basis of the vehicle running state and according to the above-indicated predetermined relationship, so as to permit a lock-up action of the lock-up clutch over a wide range of the vehicle running state. For instance, the Patent Document 1 proposes a vehicle starting slip control of the lock-up clutch (vehicle starting slip control or flexible vehicle starting control) to improve the fuel economy, by controlling a slipping state of the lock-up clutch so as to positively bring the lock-up clutch in its engaged state during starting of the vehicle with the engine operated as a vehicle drive power source, for thereby reducing a rise of an operating speed of the engine (reducing an amount of racing of the engine).

PRIOR ART DOCUMENTS

Patent Documents

Patent Document 1: JP-2005-16563 A
Patent Document 2: JP-2006-306207 A
Patent Document 3: JP-2006-306209 A
Patent Document 4: JP-2001-32922 A

SUMMARY OF THE INVENTION

Problem Solved by the Invention

By the way, the drive force of the engine of the vehicle provided with a fluid-operated power transmitting device is transmitted while vibrations of the engine generated due to explosion are damped by a working fluid. Accordingly, when the lock-up clutch is placed in a slipping state or in a fully engaged state (lock-up state), the explosion vibrations are mechanically transmitted via the lock-up clutch, so that a booming noise tends to be easily generated due to the explosion vibrations. In this respect, it is desirable to implement the slip control of the lock-up clutch for the purpose of improving the fuel economy, when the operating speed of the engine is in a range outside a resonance region in which the booming noise tends to be easily generated, or when the engine is operated in a state permitting a relatively large degree of generation of the vibrations. Described in the other way, the slip control of the lock-up clutch can be implemented over a wider range of the operating speed of the engine, if the drive force of the engine can be transmitted with a large amount of damping of the explosion vibrations. It is noted that the above-described problem is not publicly known, namely, there has been no proposal as to a solution to widen the range of the operating speed of the engine in which the slip control can be implemented with sufficient damping of the explosion vibrations of the engine, in the vehicle provided with an engine connecting/disconnecting clutch configured to selectively place a power transmitting path between the engine and the fluid-operated power transmitting device in a power transmitting state and a power cutoff state.

The present invention was made in view of the background art described above. It is therefore an object of the present invention to provide a control device of a vehicle, which permits an improvement of fuel economy of the vehicle by widening the range of the operating speed of the engine in which the slip control can be implemented.

Means for Achieving the Object

The object indicated above is achieved according to a first aspect of the present invention, which provides a control device of (a) a vehicle provided with an engine, and a fluid-operated power transmitting device provided with a lock-up clutch and configured to transmit a drive force of said engine to drive wheels, and an engine connecting/disconnecting clutch configured to selectively place a power transmitting path between the engine and the fluid-operated power transmitting device in a power transmitting state and a power cutoff state, the vehicle being able to run in an engine drive mode in which the engine is operated as a vehicle drive power source while the engine connecting/disconnecting clutch is placed in an engaged state, (b) characterized in that the above-described engine connecting/disconnecting clutch as well as the above-described, lock-up clutch is placed in a slipping state while a lock-up slip control is implemented to place the lock-up clutch in the slipping state during mining of the vehicle in the above-described engine drive mode.

Advantages of the Invention

According to the present invention described above, the engine connecting/disconnecting clutch provided as a vibration damping mechanism for damping explosion vibrations of the engine is placed in the slipping state during the lock-up slip control, making it possible to more effectively increase a damping effect and to widen the range of the engine speed in which the slip control can be implemented without a considerably high degree of booming noise, than where the engine connecting/disconnecting clutch is not placed in the slipping state. Accordingly, the range of the engine speed in which the slip control can be implemented can be widened, and the fuel economy can be improved.

In the vehicle control device of the first aspect of the invention according to a second aspect of the invention, the above-described lock-up slip control is a vehicle starting lock-up slip control to place the above-described lock-up clutch in the slipping state during starting of the vehicle with the above-described engine operated as the vehicle drive power source. According to this second aspect of the invention, the lower limit of the engine speed range in which the vehicle starting lock-up slip control, can be implemented can be lowered by placing the engine connecting/disconnecting clutch in the slipping state during the vehicle starting which is likely to cause a rise of the engine speed. Accordingly, the amount of rise of the engine speed can be more effectively reduced, and the fuel economy can be more effectively improved.

In the vehicle control device of the first or second aspect of the invention according to a third aspect of the invention, the vehicle is further provided with an electric motor connected to a power transmitting path between the above-described engine connecting/disconnecting clutch and the above-described fluid-operated power transmitting device, and the vehicle is able to run in a motor drive mode in which only the above-described electric motor is operated as the vehicle drive power source while the above-described engine connecting/disconnecting clutch is placed in a released state. According to this third aspect of the invention, when the vehicle is run in the motor drive mode, the lock-up clutch can be controlled to improve the fuel economy, without having to take account of generation of the booming noise due to the explosion vibrations of the engine. When the vehicle is run in the engine drive mode where the vehicle cannot be run in the motor drive mode, the fuel economy is improved by placing the engine connecting/disconnecting clutch in the slipping state, during the lock-up slip control.

In the vehicle control device of the third aspect of the invention according to a fourth aspect of the invention, a target value of a slipping amount of the above-described engine connecting/disconnecting clutch is set upon implementation of the above-described lock-up slip control, and the above-described electric motor is controlled to reduce a difference between the target value and an actual value of the slipping amount. According to this fourth aspect of the invention, an operating point of the engine can be controlled as desired for improving the fuel economy, by the lock-up slip control in the engine drive mode.

In the vehicle control device of any one of the first through fourth aspects of the invention according to a fifth aspect of the invention, the above-described lock-up clutch and the above-described engine connecting/disconnecting clutch are gradually brought into the fully engaged state after the above-described lock-up slip control is initiated, and the above-described lock-up slip control is terminated when one of the lock-up clutch and the engine connecting/disconnecting clutch which is more easily controllable for the full engagement than the other has been brought into the fully engaged state after the other is brought into the fully engaged state. According to this fifth aspect of the invention, the lock-up slip control is adequately implemented to adequately transmit the drive force of the engine to the drive wheels. The clutch which is more easily controllable has not yet been brought into the fully engaged state when the clutch which is less easily controllable has been brought into the fully engaged state, so that an engaging shock of the clutch which is less easily controllable is reduced.

BRIEF DESCRIPTION OF THE DRAWINGS

FIG. 5 is a time chart showing the control operation illustrated in the flow chart of FIG. 4.

MODE FOR CARRYING OUT THE INVENTION

Figure 1:
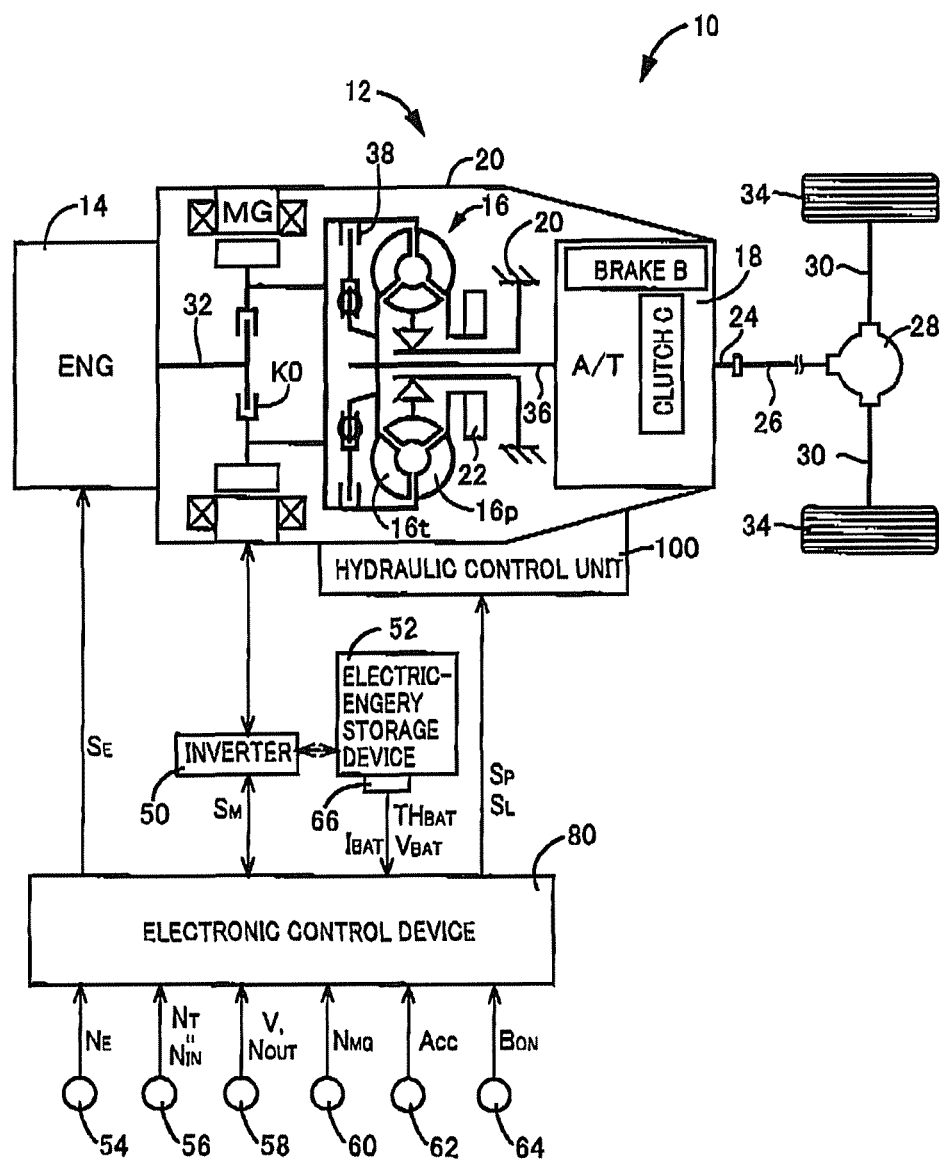
FIG. 1 is a schematic view for explaining an arrangement of a power transmitting path in a vehicle to which the present invention is applicable, the view also showing major portions of a control system provided for the vehicle.

According to the present invention, the above-described vehicle is preferably provided with an automatic transmission configured to transmit a drive force received from the engine through the above-described fluid-operated power transmitting device, to the drive wheels. This automatic transmission may be selected from among: a known automatic transmission of a planetary gear type having a plurality of gear positions (speed positions) which are selectively established by selective connection of rotary elements (rotary members) of a plurality of planetary gear sets by coupling devices; a synchronous meshing parallel-two-axes type automatic transmission which is provided with a plurality of pairs of constantly meshing shift gears mounted on two shafts and which is configured to selectively place one of the pairs of shift gears in a power transmitting state with a synchronizing device which is automatically operated by a hydraulic actuator to perform an automatic shifting action to a selected speed position; a so-called "DCT" (Dual Clutch Transmission) which is a synchronous meshing parallel-two-axes type automatic transmission which is provided with two input shafts to which respective clutches are connectable to establish even-numbered speed positions and odd-numbered speed positions, respectively; a so-called "belt-type" continuously variable transmission which has a power transmitting member in the form of a transmission belt connecting a pair of variable-diameter pulleys effective diameters of which are variable, to continuously change a speed ratio of the transmission; and a so-called "traction-type" continuously variable transmission which has a pair of cones rotatable about a common axis, and a plurality of rollers which are pressed between the pair of cones and rotatable about an axis intersecting the above-indicated common axis such that an angle of intersection between the common axis and the axis of rotation of the rollers is variable to continuously change the speed ratio of the transmission.

The coupling devices of the above-indicated planetary gear type automatic transmission are preferably selected from among widely used types of coupling devices such as clutches or brakes of a multiple-disc or single-disc type or brakes of a belt type which are placed in an engaged state by a hydraulic actuator. An oil pump to deliver a working oil for operating those coupling devices may be driven by a vehicle drive power source, to pressurize the working oil, or may be driven by an exclusive pump drive electric motor provided independently of the vehicle drive power source.

A hydraulic control unit including the above-described coupling devices is preferably configured to apply an output hydraulic pressure of a linear solenoid valve directly to a hydraulic actuator (hydraulic cylinder) of the corresponding coupling device, for a higher degree of operating response of the coupling device. However, the output hydraulic pressure of the linear solenoid valve may be used as a pilot pressure for controlling a shift control valve so that the hydraulic pressure is applied from the shift control valve to the hydraulic actuator.

The above-described linear solenoid valve is provided for each of the plurality of coupling devices, for example. In this respect, however, various modifications are possible. For example, a common linear solenoid valve may be provided for a plurality of coupling devices which are not concurrently placed in the engaged state or not concurrently controlled for engaging and releasing actions. Further, all of the coupling devices need not be hydraulically controlled by the linear solenoid valves. For instance, it is possible to use on-off solenoid valves the duty ratios of which are controlled to hydraulically control some or all of the coupling devices, or any other pressure regulating means other than the linear solenoid valves. In the description herein, an expression "to apply a hydraulic pressure" is interpreted to mean "to cause the hydraulic pressure to act" or "supply a working oil regulated to have the hydraulic pressure".

According to a still further preferred form of the invention, the above-described engine is a gasoline engine, a diesel engine or another other internal combustion engine.

According to another preferred form of the invention, the above-described engine connecting/disconnecting clutch is a coupling device of a wet or dry type.

An embodiment of this invention will be described in detail by reference to the drawings.

EMBODIMENT

FIG. 1 is the schematic view for explaining an arrangement of a power transmitting path from an engine 14 to drive wheels 34 of a hybrid vehicle 10 (hereinafter referred to as "vehicle 10") to which the present invention is applicable, the view also showing major portions of a control system provided for the vehicle 10 to implement an output control of the engine 14 functioning as a vehicle drive power source, a shift control of an automatic transmission 18, and a drive control of an electric motor MG functioning as another vehicle drive power source.

A vehicular power transmitting system 12 (hereinafter referred to as "power transmitting system 12") shown in FIG. 1 is provided with an engine connecting/disconnecting clutch K0, an electric motor MG, a torque converter 16, an oil pump 22, and an automatic transmission 18, which are arranged in the order of description from the side of the engine 14 and which are accommodated within a transmission casing 20 (hereinafter referred to as "casing 20") which is a stationary member attached to a vehicle body with bolts, for example. The power transmitting system 12 is further provided with: a propeller shaft 26 connected to, a transmission output shaft 24 that is an output rotary member of the automatic transmission 18; a differential gear device (differential gear) 28 connected to the propeller shaft 26; and a pair of axles 30 connected to the differential gear device 28. The power transmitting system 12 thus constructed is suitably used for the vehicle 10 of an FR (front-engine rear-drive) type. In the power transmitting system 12, a drive force of the engine 14 is transmitted from an engine connecting shaft 32 connecting the engine 14 and the engine connecting/disconnecting clutch K0 to each other, to a pair of the drive wheels 34 through the engine connecting/disconnecting clutch K0, torque converter 16, automatic transmission 18, propeller shaft 26, differential gear device 28 and pair of axles 30 in the order of description, while the engine connecting/disconnecting clutch K0 is placed in its fully engaged state.

The torque converter 16 is a fluid-operated power transmitting device configured to transmit the drive force received from its pump impeller 16p, to the automatic transmission 18 through a working fluid. The pump impeller 16p is connected to the engine 14 through the engine connecting/disconnecting clutch K0 and the engine connecting shaft 32 in this order of description, and is an input rotary element of the torque converter 16 which is rotatable about its axis and which receives the drive force from at least one of the engine 14 and the electric motor MG. The torque converter 16 has an output rotary element in the form of a turbine impeller 16t which is splined or otherwise connected to a transmission input shaft 36 such that the turbine impeller 16t is not rotatable relative to, the transmission input shaft 36. The transmission input shaft 36 is an input rotary member of the automatic transmission 18. Thus, the transmission input shaft 36 serves as a turbine shaft rotated by the turbine impeller 16t. The torque converter 16 is further provided with a lock-up clutch 38 which permits direct connection between the pump impeller 16p and the turbine impeller 16t, namely, between the input and output rotary members of the torque converter 16. To the pump impeller 16p, there is connected a mechanical oil pump 22 which is operated by at least one of the engine 14 and the electric motor MG, to pressurize a working oil used to control shifting actions of the automatic transmission 18, to control the lock-up clutch 38 and to lubricate various lubricating points.

Figure 2:
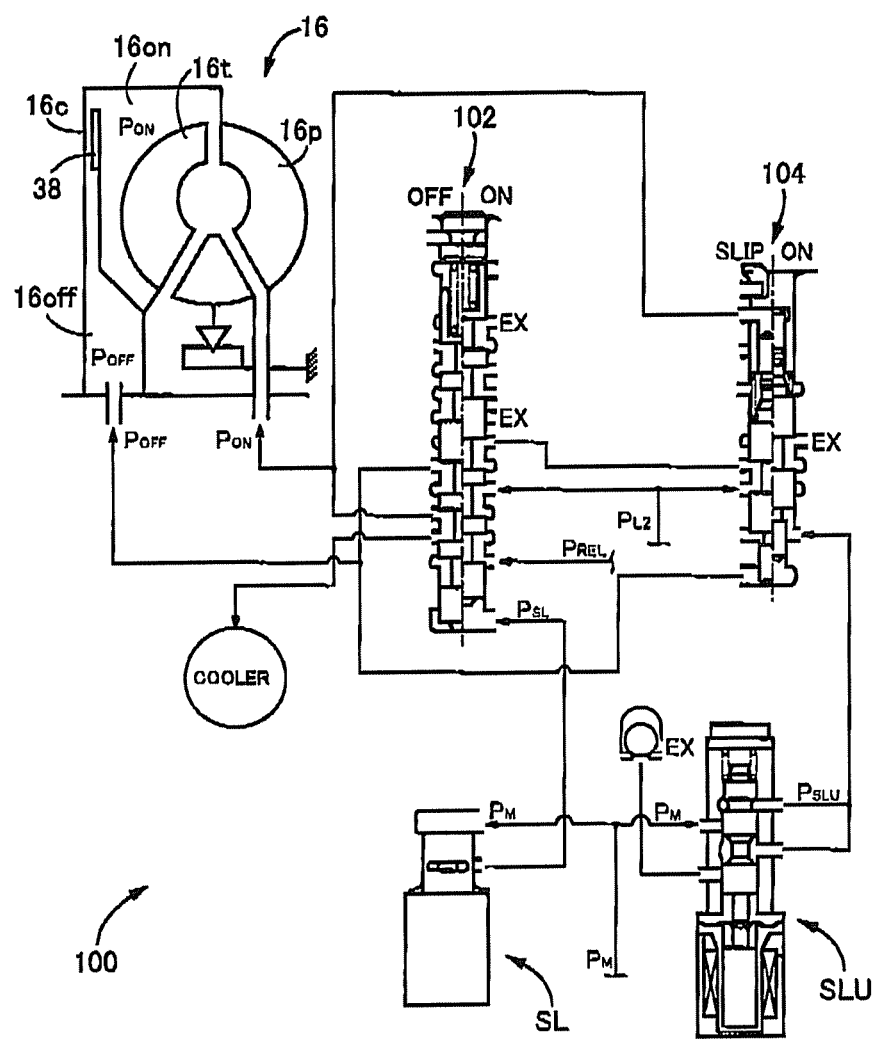
FIG. 2 is a hydraulic circuit diagram relating to operations of a lock-up clutch and other elements of a hydraulic control unit.

As well known in the art, the lock-up clutch 38 is a hydraulically operated friction clutch which has a mechanism provided with friction members configured to slip with each other to generate a speed difference therebetween and which is brought into slipping engagement with a front cover 16c according to a hydraulic pressure difference $\Delta P$ ($=P_{ON}-P_{OFF}$) between a hydraulic pressure $P_{ON}$ in an engaging oil chamber 16on and a hydraulic pressure $P_{OFF}$ in a releasing oil chamber 16off, which hydraulic pressure difference $\Delta P$ is controlled by a hydraulic control unit 100 (as shown in FIG. 2). The torque converter 16 is selectively placed in one of three operating states consisting of: a so-called non-lock-up state (lock-up off state) in which the lock-up clutch 38 is placed in its released state with a negative value of the hydraulic pressure difference $\Delta P$; a so-called lock-up slipping state (slipping state) in which the lock-up clutch 38 is placed in its slipping state with the hydraulic pressure difference $\Delta P$ being higher than zero; and a so-called lock-up state (engaged state or lock-up on state) in which the lock-up clutch 38 is placed in its fully engaged state with a maximum value of the hydraulic pressure difference $\Delta P$, for instance. In the slipping state of the lock-up clutch 38 with the hydraulic pressure difference $\Delta P$ being zero, for instance, the lock-up clutch 38 does not receive a torque so that the torque converter 16 is placed in an operating condition similar to the lock-up off state.

The electric motor MG is a so-called motor/generator having a function of an electric motor operable to convert an electric energy into a mechanical drive force, and a function of an electric generator operable to convert a mechanical energy into an electric energy. In other words, the electric motor MG can function as a vehicle drive power source for generating a vehicle drive force, in place of, or together with another vehicle drive power source in the form of the engine 14. The electric motor MG can also function to perform a regenerative operation with the drive force generated by the engine 14 or a kinetic drive force (mechanical energy) received from the drive wheels 34, to generate an electric energy which is stored in an electric-energy storage device 52 via an inverter 50. The electric motor MG is connected to a power transmitting path between the engine connecting/disconnecting clutch K0 and the torque converter 16 (namely, operatively connected to the pump impeller 16p), such that a drive force is transmitted between the electric motor MG and the pump impeller 16p. Accordingly, like the engine 14, the electric motor MG is operatively connected to the transmission input shaft 36.

The engine connecting/disconnecting clutch K0 is a hydraulically operated frictional coupling device of a wet multiple-disc type having a plurality of friction plates which are superposed on each other and which are forced against each other by a hydraulic actuator. The engine connecting/disconnecting clutch K0 is selectively placed in an engaged state and a released state with the hydraulic pressure generated by the oil pump 22, under the control of the hydraulic control unit 100 provided in the power transmitting system 12. When the engine connecting/disconnecting clutch K0 is selectively brought into its engaged or released state, a torque capacity which is a torque that can be transmitted through the engine connecting/disconnecting clutch K0, namely, an engaging force of the engine connecting/disconnecting clutch K0 is continuously changed with hydraulic pressure regulation by a linear solenoid valve, etc. incorporated in the hydraulic control unit 100. The engine connecting/disconnecting clutch K0 is provided with a pair of rotary members (a clutch hub and a clutch drum) which are rotatable relative to each other when the engine connecting/disconnecting clutch K0 is placed in the released state. One of the rotary members (clutch hub) is connected to the engine connecting shaft 32 such that this rotary member is not rotatable relative to the engine connecting shaft 32, while the other rotary member (clutch drum) is connected to the pump impeller 16p of the torque converter 16 such that this rotary member is not rotatable relative to the pump impeller 16p. When the thus constructed engine connecting/disconnecting clutch K0 is placed in the engaged state, the pump impeller 16p is rotated together with the engine 14 via the engine connecting shaft 32. Namely, the drive force of the engine 14 is transmitted to the pump impeller 16p in the engaged state of the engine connecting/disconnecting clutch K0. In the released state of the engine connecting/disconnecting clutch K0, on the other hand, the pump impeller 16p is operatively disconnected from the engine 14. Since the electric motor MG is operatively connected to the pump impeller 16p as described above, the engine connecting/disconnecting clutch K0 functions not only as a clutch for connecting and disconnecting the engine 14 to and from the torque converter 16, but also as a clutch for connecting and disconnecting the engine 14 to and from the electric motor MG.

The automatic transmission 18 is operatively connected to the electric motor MG without the engine connecting/disconnecting clutch K0 interposed therebetween, and constitutes a part of a power transmitting path from the engine 14 to the drive wheels 34, to transmit the drive force from the vehicle drive power source (engine 14 and electric motor MG) to the drive wheels 34. The automatic transmission 18 is a known multiple-step transmission of a planetary gear type having a plurality of speed positions (gear positions) which are selectively established with engaging and releasing actions of a plurality of hydraulically operated frictional coupling devices such as clutches C and brakes B. In the automatic transmission 18, the clutches C and brakes B are selectively placed in their engaged and released states under the control of the hydraulic control unit 100, to establish one of the gear positions (speed positions) according to an operation of an accelerator pedal by a vehicle operator and a running speed V of the vehicle.

The vehicle 10 is further provided with an electronic control device 80 including a control device for implementing hybrid controls of the vehicle 10. For instance, the electronic control device 80 includes a so-called microcomputer incorporating a CPU, a RAM, a ROM and an input-output interface, and the CPU performs signal processing operations according to programs stored in the ROM while utilizing a temporary data storage function of the RAM, for implementing various controls for the vehicle 10. For example, the electronic control device 80 implements the output controls of the engine 14, the drive controls of the electric motor MG including a regenerative control thereof, the shift control of the automatic transmission 18, a torque capacity control of the lock-up clutch 38, and a torque capacity control of the engine connecting/disconnecting clutch K0. The electronic control device 80 consists of functional units such as an engine control unit, an electric motor control unit and a hydraulic, control unit (shift control unit), as needed. The electronic control device 80 is configured to receive output signals of various sensors (for example, various speed sensors 54, 56, 58 and 60, an accelerator pedal operation amount sensor 62, a brake sensor 64 and a battery sensor 66). These output signals include: a signal indicative of an engine speed $N_E$; a signal indicative of a turbine speed $N_T$, that is, a transmission input speed $N_{IN}$; a signal indicative of a transmission output speed $N_{OUT}$ corresponding to the vehicle running speed. V; a signal indicative of an electric motor speed $N_M$; a signal indicative of an operation amount Acc of an accelerator pedal; a signal indicative of an operated state (on state) $B_{ON}$ of a braking system; a signal indicative of a battery temperature $TH_{BAT}$ of the electric-energy storage device 52; a signal indicative of a battery charging/discharging current $I_{BAT}$ of the electric-energy storage device 52; and a battery voltage $V_{BAT}$ of the electric energy storage device 52. The electronic control device 80 is further configured to generate various signals including: engine output control command signals SE for the output controls of the engine 14; electric motor control command signals $S_M$ for controlling an operation of the electric motor MG; hydraulic control command signals $S_P$ for controlling the hydraulic actuator of the engine connecting/disconnecting clutch K0, and the hydraulic actuators of the clutches C and brakes B of the automatic transmission 18; and lock-up control command signals $S_L$ for controlling the engaging and releasing actions and a slipping amount (slipping speed) $N_S (=N_E-N_T)$ of the lock-up clutch 38. It is noted that the electronic control device 80 calculates from time to time an electric energy amount (charging capacity) SOC of the electric-energy storage device 52 on the basis of the above-indicated battery temperature $TH_{BAT}$, battery charting/discharging current $I_{BAT}$, and battery voltage $V_{BAT}$.

FIG. 2 is the hydraulic circuit diagram relating to operations of the lock-up clutch 38 and other elements of the hydraulic control unit 100. As shown in FIG. 2, the hydraulic control unit 100 is provided with a switching solenoid valve SL, a lock-up relay valve 102, a slip control linear solenoid valve SLU and a lock-up control valve 104. The switching solenoid valve SL is turned on and off according to an on-off signal received from the electronic control device 80, to generate a switching pilot pressure $P_{SL}$. The lock-up relay valve 102 is provided to selectively place the lock-up clutch 38 in one of its fully released state, slipping state and fully engaged state. The slip control linear solenoid valve SLU is configured to generate, a pilot pressure $P_{SLU}$ according to a drive current $I_{SLU}$ corresponding to a lock-up clutch pressure command value (LU clutch pressure command value) $S_{SLU}$ received from the electronic control device 80. The lock-up control valve 104 is configured to place the lock-up clutch 38 in the slipping state or fully engaged state (namely, to switch the operating state of the lock-up clutch 38 to the slipping state or lock-up on state) by controlling a differential speed $N_S$ of the lock-up clutch 38 according to the pilot pressure $P_{SLU}$ when the lock-up relay valve 102 is placed in an on-side position for placing the lock-up clutch 38 in the slipping state or fully engaged state.

The hydraulic control unit 100 constructed as described above controls flows of the working oil into and from the engaging oil chamber 16on and the releasing oil chamber 16off, to control the operating state of the lock-up clutch 38. When the lock-up relay valve 102 is switched to the on-side position by the switching solenoid valve SL, for example, a second line pressure PL2 is applied as the hydraulic pressure $P_{ON}$ to the engaging oil chamber 16on, while at the same time the hydraulic pressure $P_{OFF}$ in the releasing oil chamber 16off is regulated by the lock-up control valve 104 (namely, the hydraulic pressure difference $\Delta P$ (= $P_{ON}$-$P_{OFF}$), that is, the engaging pressure is regulated by the lock-up control valve 104), so that the lock-up clutch 38 is switched to the slipping state or lock-up on state. When the lock-up relay valve 102 is switched to an off-side position, on the other hand, the second line pressure PL2 is applied to the releasing oil chamber 16off, and the working oil is discharged from the releasing oil chamber 16off through the engaging oil chamber 16on, and fed into an oil cooler through the lock-up relay valve 102, so that the discharged working oil is cooled. As a result, the lock-up clutch 38 is placed in the fully released state. It is noted that the hydraulic pressure difference $\Delta P$ controlled according to the pilot pressure $P_{SLU}$ of the slip control linear solenoid valve SLU is the hydraulic pressure representing fully engaged or released state of the lock-up clutch 38, which is referred to as a lock-up clutch pressure (LU clutch pressure) $P_{LU}$ in the present embodiment. This LU clutch pressure $P_{LU}$ is the hydraulic pressure corresponding to the differential speed $N_S$ and the torque capacity of the lock-up clutch 38 (lock-up clutch torque) $T_{LU}$. It is also noted that the LU clutch pressure command value $S_{SLU}$ and the pilot pressure $P_{SLU}$ of the slip control linear solenoid valve SLU are command values of the LU clutch pressure $P_{LU}$.

Figure 3:
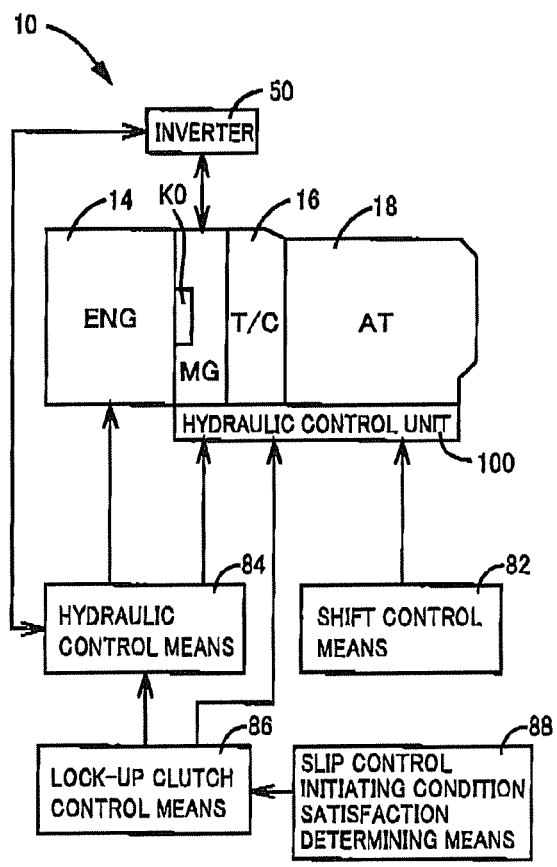
FIG. 3 is a functional block diagram for explaining major control functions of an electronic control device.

FIG. 3 is the functional block diagram for explaining major control functions of the electronic control device 80. A shift control portion in the form of shift control means 82 shown in FIG. 3 is configured to determine whether the automatic transmission 18 should be shifted from the presently established speed position, that is, to determine the speed position to which the automatic transmission 18 should be shifted. This determination is made on the basis of the vehicle running condition (represented by the actual values of the running speed V and accelerator pedal operation amount Ace, for example), and according to a stored known relationship (shifting lines or shifting map). The shift control means 82 implements an automatic shift control to shift the automatic transmission 18 to the determined speed position.

A hybrid control portion in the form of hybrid control means 84 is configured to function as engine drive control means for controlling an operation of the engine 14, and as electric motor control means for controlling the operation of the electric motor MG as the vehicle drive power source or the electric generator, through the inverter 50, to implement the hybrid drive controls of the engine 14 and the electric motor MG. For example, the hybrid control means 84 calculates a required vehicle torque on the basis of the accelerator pedal operation amount Acc and the vehicle running speed V, and controls the vehicle drive power source (engine 14 and electric motor MG) to provide an output torque for obtaining the calculated required vehicle torque, while taking account of a power transmission loss, loads acting on optionally provided devices, the presently established speed position of the automatic transmission 18, the stored electric energy amount SOC of the electric-energy storage device 52 etc.

Described more specifically, the hybrid control means 84 is configured to select a motor drive mode (hereinafter referred to as "EV mode") as the vehicle drive mode where the above-described calculated required vehicle torque can be obtained by an electric motor torque $T_M$, and to implement a motor drive run (EV run) for driving the vehicle with only the electric motor MG used as the vehicle drive power source. Where the above-described calculated required vehicle torque cannot be obtained without using at least an engine torque $T_E$, on the other hand, the hybrid control means 84 selects an engine drive mode, that is, a hybrid drive mode (hereinafter referred to as "HV mode"), to implement an engine drive run, that is, a hybrid drive run (HV run) for driving the vehicle with at least the engine 14 used as the vehicle drive power source.

It is noted that the above-described expression "required vehicle torque" is interpreted to comprehend not only a forward torque required to drive the drive wheels 34 with a torque transmitted thereto from the side of the engine 14, but also a braking torque, namely, a reverse torque corresponding to a target vehicle deceleration value G*, which is transmitted from the drive wheels 34 toward the side of the engine 14 (on the side of the electric motor MG). Accordingly, the required vehicle torque is a positive value when the torque is transmitted to the drive wheels 34, and a negative value when the torque is transmitted from the side of the engine 14. It is further noted that the required vehicle torque can be converted into a transmission output torque $T_{OUT}$ represented by the torque of the transmission output shaft 24, a transmission input torque $T_{AT}$ represented by the torque of the transmission input shaft 36, or an input torque of the power transmitting system 12 represented by the input torque of the pump impeller 16a. Therefore, the transmission output torque $T_{OUT}$, the transmission input torque $T_{AT}$ and the input torque of the power transmitting system 12, as well as the output torque of the drive wheels 34, can be used as the required vehicle torque. Further, the accelerator pedal operation amount Acc, an opening angle $\theta_{TH}$ of a throttle valve and an intake air quantity $Q_{AIR}$ can also be used as the required vehicle torque.

When the EV run is implemented, the hybrid control means 84 brings the engine connecting/disconnecting clutch K0 into the released state for placing the power transmitting path between the engine 14 and the torque converter 16 in the power cutoff state, and commands the electric motor MG to provide the electric motor torque MG required to implement the EV run. When the EV run is implemented, on the other hand, the hybrid control means 84 brings the engine connecting/disconnecting clutch K0 into the engaged state for transmitting the drive force of the engine 14 to the pump impeller 16p, and commands the electric motor MG to provide an assisting torque as needed.

The hybrid control means 84 is further configured to permit the electric motor MG to function as an engine starter motor. For example, the hybrid control means 84 starts the engine 14 by gradually bringing the engine connecting/disconnecting clutch K0 into the fully engaged state to transmit an engine starting torque $T_M$s from the electric motor MG to the engine 14 through the engine connecting/disconnecting clutch K0, and by implementing ignition of the engine 14 and a fuel supply to the engine 14 while the operating speed $N_E$ of the engine is raised to or more, than a predetermined value, so that the engine 14 is started.

A lock-up clutch control portion in the form of lock-up clutch control means 86 is configured to determine one of a lock-up off region, a lock-up slip region and a lock-up on region in which the vehicle running state (represented by the actual values of the running speed V and the opening angle $\theta_{TH}$ of the throttle valve, for example) falls, according to a stored relationship (lock-up control region map or boundary lines), and to apply the lock-up control command signal $S_L$ to the hydraulic control unit 100, for placing the lock-up clutch 38 in the released state, or in the slipping or engaged state. Upon determination that the vehicle running state falls in the lock-up slip region, the lock-up clutch control means 86 calculates from time to time the actual differential speed $N_S$ of the lock-up clutch 38, and applies the lock-up control command signal $S_L$ to the hydraulic control unit 100, for controlling the hydraulic pressure difference $\Delta P$ so that the actual differential speed $N_S$ coincides with a target value $N_S^*$. The lock-up clutch control means 86 places the lock-up clutch 38 in the fully engaged state to prevent a slipping loss (internal loss) of the torque converter 16 for thereby improving the fuel economy of the vehicle, when the vehicle running speed is comparatively high in a given speed position of the automatic transmission. When the vehicle running speed is comparatively medium or low in a given speed position of the automatic transmission, the lock-up clutch control means 86 implements the slip control (lock-up slip control) for placing the lock-up clutch 38 in the slipping state with a predetermined small amount of slipping corresponding to the target differential speed $N_S^*$ of about 50 rpm-100 rpm, for example, so that the lock-up control region is enlarged to improve a power transmission efficiency of the torque converter 16 for thereby improving the fuel economy.

The lock-up clutch control means 86 is further configured to implement a vehicle starting lock-up slip control (vehicle starting slip control) for placing the lock-up clutch 38 in the slipping state, to reduce an amount of rise of the engine speed $N_E$ (an amount of the engine racing), upon starting of the vehicle with the engine 14 operated as the vehicle drive power source, so that the fuel economy is improved with the engine 14 being operated at a low speed with a high torque at which a combustion efficiency of the engine 14 is comparatively high. When a predetermined vehicle starting slip control initiating condition is satisfied, for instance, this vehicle starting slip control permits reduction of the amount of rise of the engine speed $N_E$ and consequent reduction of an amount of consumption of the fuel, assuring a good compromise between the fuel economy and a drivability of the vehicle according to a required acceleration value of the vehicle 10 as represented by the accelerator pedal operation amount Acc. In the vehicle running state in which the vehicle starting slip control is implemented, it is difficult to control the differential speed $N_S$ in the process of rise of the engine speed. $N_E$ immediately after an operation of the accelerator pedal (immediately after initiation of the vehicle starting) in the released state of the lock-up clutch 38. Accordingly, the vehicle starting slip control is implemented in an open loop (open-loop or feed forward) control mode in which the LU clutch pressure command value $S_{SLU}$ is set according to the accelerator pedal operation amount Acc, so as to reduce the amount of rise of the engine speed. $N_E$. Upon determination that the vehicle running state falls in the lock-up slip region, for instance, the slip control (the feedback control which is referred to as a "steady-state lock-up slip control (steady-state slip control)") is implemented to place the lock-up clutch 38 in the slipping state so that the differential speed $N_S$ coincides with the target value, as described above. Upon determination that the differential speed $N_S$ is reduced to a predetermined value $N_S'$ during the vehicle starting slip control, on the other hand, the vehicle starting slip control is followed by the steady-state slip control (acceleration slip control). This steady-state slip control is implemented in a closed loop feedback control mode in which the LU clutch pressure command value $S_{SLU}$ is set from time to time on the basis of an error $\Delta N_S$ ($=N_S^* - N_S$) of the actual value of the differential speed $N_S$ (actual differential speed value $N_S$) with respect to the target value (target differential speed value $N_S^*$), for example.

For example, the above-described vehicle starting slip control initiating condition is satisfied when all of the following states are satisfied: a state in which the braking system is placed in a non-operated state, namely, the signal indicative of the operated state $B_{ON}$ of the braking system is not generated; a state in which the working oil temperature $TH_{OIL}$ falls within a predetermined range from a value at which an engine warm-up operation is completed, to a predetermined high value; a state in which the automatic transmission is placed in a first speed position and is not in a shifting action; a state in which the accelerator pedal has been operated after determination that the vehicle 10 is stationary; a state in which the accelerator pedal operation amount Acc is smaller than a predetermined upper limit; and a state in which the engine speed $N_E$ falls in a vehicle starting slip control permitting range.

It is noted that the above-described vehicle starting slip control is implemented to place the lock-up clutch 38 in a slipping state and to gradually bring the lock-up clutch 38 into the fully engaged state, so as to reduce an amount of temporary rise of the engine speed $N_E$ as a result of an operation of the accelerator pedal for starting the vehicle with the engine 14 operated as the vehicle drive power source. Accordingly, the vehicle starting slip control initiating condition includes the state in which the vehicle is started with a comparatively small value of the accelerator pedal operation amount Acc, in order to prevent the vehicle operator from feeling uneasy about the vehicle acceleration value in response to the accelerator pedal operation amount Acc.

While the above-described vehicle starting slip permitting range is set by taking account of an improvement of the fuel economy by reduction of the amount of rise of the engine speed $N_E$, for example, the vehicle drivability and the booming noise (e.g., NVH characteristics (noise, vibration and operator's driving comfort) are also taken into account to set this vehicle starting slip permitting range. On the other hand, an effect of damping of an explosion vibrations of the engine 14 is obtained by the vehicle starting slip control to place only the lock-up clutch 38 in the slipping state, owing to only the slipping action of the lock-up clutch 38 and a damper provided in the power transmitting path. In view of this, the vehicle starting slip permitting range of the engine speed is set so as to exclude a resonance region of the engine 14 in which the booming noise is highly likely to be generated due to the explosion vibrations of the engine 14 during the vehicle starting slip control (namely, during a transition from power transmission by the torque converter 16 via the working fluid, to mechanical power transmission through the lock-up clutch 38). Since the likelihood of generation of the booming noise increases with a decrease of the engine speed $N_E$, the vehicle starting slip permitting range is predetermined, as a vehicle starting slip permitting range A, by experimentation so as to prevent the generation of the booming noise, such that the lower limit of the vehicle starting slip permitting range A is equal to or higher than a slip control permitting threshold speed $N_EA$ which is higher by a suitable amount than an idling speed $N_{IDL}$ of the engine 14, for instance.

By the way, the vehicle 10 according to the present embodiment is provided with the engine connecting/disconnecting clutch K0, so that the effect of damping of the explosion vibrations of the engine 14 can be increased by placing this engine connecting/disconnecting clutch K0 in a slipping state. Accordingly, it is considered possible to set the vehicle starting slip permitting range such that the lower limit of this range is lower than the lower limit of the vehicle starting slip permitting range A which is set where the engine connecting/disconnecting clutch K0 is not placed in a slipping state.

In view of the above-indicated consideration, the electronic control device 80 according to the present embodiment is configured to place the engine connecting/disconnecting clutch K0 as well as the lock-up clutch 38 in a slipping state in the above-described vehicle starting slip control. Accordingly, the vehicle starting slip permitting range where the engine connecting/disconnecting clutch K0 is placed in a slipping state is set, as a vehicle starting slip permitting range B, by experimentation so as to prevent the generation of the booming noise, such that the lower limit of the vehicle starting slip permitting range B is equal to or higher than a slip control permitting threshold speed $N_EB$ and is lower than the lower limit of the slip control permitting threshold speed $N_EA$ to be set where the engine connecting/disconnecting clutch K0 is not placed in a slipping state. In this respect, it is noted that the above-indicated slip control permitting threshold speed. $N_EB$ varies with a slipping amount $\Delta N_K (=N_E-N_M)$ of the engine connecting/disconnecting clutch K0. For instance, the lower limit of the slip control permitting threshold speed $N_EB$ can be lowered with an increase of a target slipping amount $\Delta N_K'$ of the engine connecting/disconnecting clutch K0, as far as a desired effect of reduction of the amount of rise of the engine speed $N_E$ is obtained by the vehicle starting slip control. Accordingly, the target slipping amount $\Delta N_K'$ of the engine connecting/disconnecting clutch K0 and the slip control permitting threshold speed $N_EB$ are predetermined in accordance with a specific type of the vehicle, so as to assure a good compromise among smooth transmission of the drive force of the engine 14, a moment of initiation of the vehicle starting slip control, etc.

Described more specifically, a slip control initiating condition satisfaction determining portion in the form of slip control initiating condition satisfaction determining means 88 is configured to determine, during running of the vehicle with the engine 14 operated as the vehicle drive power source, whether the above-indicated predetermined vehicle starting slip control initiating condition is satisfied or not. In this respect, it is particularly noted that the determinations by the slip control initiating condition satisfaction determining means 88 according to the present embodiment include a determination as to whether the engine speed $N_E$ falls within the vehicle starting slip permitting range B, namely, as to whether the engine speed $N_E$ which is raised in response to an operation of the accelerator pedal has reached the slip control permitting threshold speed $N_EB$.

The lock-up clutch control means 86 implements the vehicle starting slip control to place the lock-up clutch 38 in a slipping state, when the slip control initiating condition satisfaction determining means 88 has determined that the above-indicated predetermined vehicle starting slip control initiating condition is satisfied during the vehicle running with the engine 14 operated as the vehicle drive power source. In the vehicle starting slip control, the lock-up clutch control means 86 brings the engine connecting/disconnecting clutch K0 from its fully engaged state to a slipping state such that the engine connecting/disconnecting clutch K0 is temporarily held in the slipping state. Namely, the vehicle starting slip control is initiated by concurrently initiating a slipping action of the lock-up clutch 38 and a slipping action of the engine connecting/disconnecting clutch K0. At this time, the lock-up clutch control means 86 generates the hydraulic control command signal (K0 clutch pressure command signal) $S_P$ for controlling the slipping action of the engine connecting/disconnecting clutch K0 such that the slipping amount coincides with the target value $\Delta N_K'$.

For easier hydraulic control of the slipping action of the engine connecting/disconnecting clutch K0, the electric motor MG which is easily controllable may be controlled together with the hydraulic pressure control, so that the actual, slipping amount $\Delta N_K$ coincides with the target value $\Delta N_K'$. That is, when the vehicle starting slip control is implemented by the lock-up clutch control means 86, the hybrid control means 84 may control the electric motor MG so as to reduce a difference of the actual, slipping amount $\Delta N_K$ with respect to the target value $\Delta N_K'$. Although the engine connecting/disconnecting clutch K0 used in the present embodiment is a hydraulically controllable coupling device of a wet type, it is advantageous to control the electric motor MG so as to establish the target slipping amount $\Delta N_K'$ as described above, where a coupling device of a dry type is used as the engine connecting/disconnecting clutch K0, since the dry type coupling device is considered to be more difficult to be hydraulically controlled than the wet type coupling device.

After initiation of the vehicle starting slip control and a slipping action of placing the lock-up clutch 38, the lock-up clutch control means 86 gradually brings the lock-up clutch 38 into the fully engaged state as described previously, and also brings the engine connecting/disconnecting clutch K0 back into the fully engaged state after it is once held in a slipping state. The lock-up clutch control means 86 terminates the vehicle starting slip control when both of the lock-up clutch 38 and the engine connecting/disconnecting clutch K0 have been brought into the fully engaged state. Upon termination of the vehicle starting slip control, the lock-up clutch 38 and the engine connecting/disconnecting clutch K0 may be substantially concurrently brought into the fully engaged state, for example. However, one of the lock-up clutch 38 and the engine connecting/disconnecting clutch K0 which is more easily controllable for its full engagement than the other may be brought into the fully engaged state after the other has been brought into the fully engaged state. That is, the slipping amount of the above-indicated other clutch which is less easily controllable tends to be zeroed in a non-linear manner but in steps in response to the clutch pressure command value for the full engagement, so that an engaging shock of this other clutch has a higher possibility of generation of a shock upon the full engagement. Therefore, the less easily controllable clutch is brought into the fully engaged state while the more easily controllable clutch is still held in the slipping state, in order to reduce the full engagement shock of the less easily controllable clutch. Then, the more easily controllable clutch the full engagement shock of which is smaller is brought into the fully engaged state. For instance, the lock-up clutch 38 may be brought into the fully engaged state after the engine connecting/disconnecting clutch K0 is brought into the fully engaged state, since the lock-up clutch 38 is originally designed for a slipping action as a part of its function, and is considered to be more easily controllable for its full engagement than the engine connecting/disconnecting clutch K0 which is not originally designed for a slipping action as a part of its function.

Figure 4:
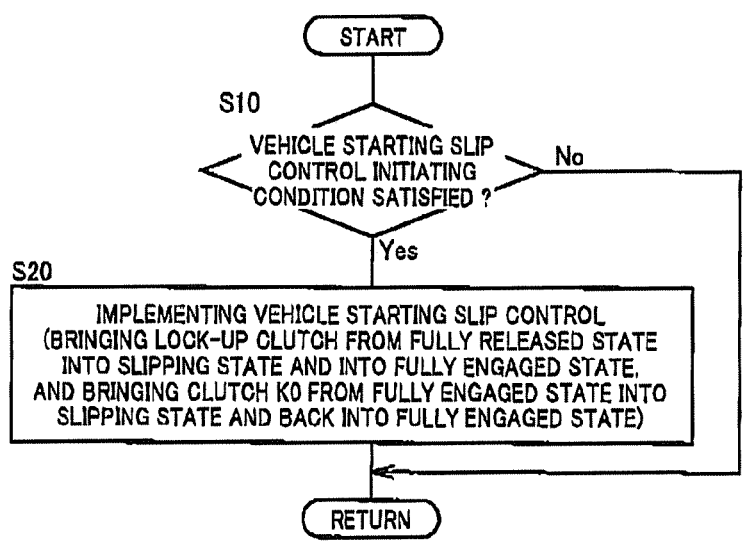
FIG. 4 is a flow chart for explaining a major control operation of the electronic control device, namely, a control operation performed to improve fuel economy of the vehicle by widening a range of the operating speed of the engine in which a vehicle starting slip control can be implemented.

FIG. 4 is the flow chart for explaining a major control operation of the electronic control device 80, namely, a control operation performed to improve the fuel economy of the vehicle by widening a range of the engine operating speed in which the vehicle starting slip control can be implemented. The control operation is repeatedly performed with an extremely short cycle time from several milliseconds to several tens of milliseconds, for example. FIG. 5 is the time chart showing the control operation illustrated in the flow chart of FIG. 4.

The control operation of FIG. 4 is initiated with step S10 (hereinafter "step" being omitted) corresponding to the slip control initiating condition satisfaction determining means 88, to determine, during vehicle running with the engine 14 operated as the vehicle drive power source, whether the above-indicated vehicle starting slip control initiating condition is satisfied or not. If a negative determination is obtained in S10, the present control routine is terminated. If an affirmative determination is obtained in S10, the control flow goes to S20 corresponding to the lock-up clutch control means 86, to implement the vehicle starting slip control for placing the lock-up clutch 38 in a slipping state, and for bringing the engine connecting/disconnecting clutch K0 from its fully engaged state to a slipping state upon initiation of the vehicle starting slip control, and temporarily holding the engine connecting/disconnecting clutch K0 in the slipping state. Then, the lock-up clutch 38 and the engine connecting/disconnecting clutch K0 are brought into the fully engaged state, and the vehicle starting slip control is terminated when the lock-up clutch 38 and the engine connecting/disconnecting clutch K0 have been both placed in the fully engaged state (see a time period from a point of time t2 to a point of time t4 indicated in FIG. 5). It is noted that the electric motor MG may be controlled in S20 to control the actual slipping amount $\Delta N_K$ for coincidence with the target value $\Delta N_K'$. In this case, the engine operating point (engine speed $N_E$) is easily controlled as desired for further improving the fuel economy relative to a case using the hydraulic control. For reducing the engaging shock upon full engagement, one of the lock-up clutch 38 and the engine connecting/disconnecting clutch K0 which is more easily controllable for the full engagement than the other may be brought into the fully engaged state after the other is brought into the fully engaged state.

As indicated in FIG. 5, the vehicle is started with the engine 14 operated as the vehicle drive power source (at a point of time t1), in response to an operation of the accelerator pedal while the vehicle is stationary (prior to the point of time t1). When the above-described predetermined vehicle starting slip control initiation condition is satisfied, the vehicle starting slip control is implemented. For instance, this vehicle starting slip control may be initiated at the slip control permitting threshold speed at which a booming noise due to the explosion vibrations of the engine 14 is not generated. In the prior art indicated by broken lines in FIG. 5, the engine connecting/disconnecting clutch K0 is not placed in a slipping state during the vehicle starting slip control, the vehicle starting slip control is initiated at the slip control permitting threshold speed $N_E A$ (at a point of time t3). In the present embodiment indicated by solid lines in FIG. 5, on the other hand, the engine connecting/disconnecting clutch K0 as well as the lock-up clutch 38 is placed in a slipping state during the vehicle starting slip control, so that the effect of damping of the explosion vibrations of the engine 14 is increased, and the vehicle starting slip control is initiated (at a point of time t2) at the slip control permitting threshold speed $N_E B$ which is lower than the slip control permitting threshold speed $N_E A$. The vehicle starting slip control is terminated (at a point of time t4) when both of the lock-up clutch 38 and the engine connecting/disconnecting clutch K0 have been brought into the fully engaged state. Accordingly, the present embodiment makes it possible to more effectively reduce the amount of rise of the engine speed $N_E$ and more effectively improve the fuel economy, than the prior art (see an area A enclosed by the broken and solid lines in FIG. 5). In this respect, it is noted that a speed difference between the engine speed $N_E$ indicated by a solid line and the electric motor speed $N_M$ indicated by a two-dot chain line corresponds to an actual slipping amount $\Delta N_K$ caused by a slipping action of the engine connecting/disconnecting clutch K0.

In the present embodiment, the vehicle is started with the engine torque $T_E$, so that the fuel economy can be effectively improved when the vehicle is started with the engine where the electric motor MG cannot be used as the vehicle drive power source. The slipping actions of both of the lock-up clutch 38 and the engine connecting/disconnecting clutch K0 result in dispersing a slipping action of the power transmitting path taking place at two portions thereof for reducing increase of the engine rotation speed $N_E$, making it possible to reduce the amount of generation of heat by each of those clutches, so that the durability of each clutch is improved, and the clutch can be small-sized.

The present embodiment described above is configured such that the engine connecting/disconnecting clutch K0 as well as the lock-up clutch 38 is placed in a slipping state while the lock-up slip control is implemented to place the lock-up clutch in the slipping state during the vehicle starting slip control. Thus, the engine connecting/disconnecting clutch K0 provided as a vibration damping mechanism for damping the explosion vibrations of the engine 14 is placed in the slipping state, making it possible to more effectively increase the damping effect and to widen a range of the engine speed in which the vehicle starting slip control can be implemented without a considerably high degree of booming noise, than where the engine connecting/disconnecting clutch K0 is not placed in the slipping state. Thus, the range of the engine speed in which the vehicle starting slip control can be implemented is widened, resulting in improvement of fuel economy. Namely, the lower limit of the engine'speed range in which the vehicle starting slip control can be implemented can be lowered by placing the engine connecting/disconnecting clutch K0 in the slipping state during the vehicle starting which is likely to cause a rise of the engine speed $N_E$. Accordingly, the amount of rise of the engine speed $N_E$ can be more effectively reduced, and the fuel economy can be more effectively improved.

The present embodiment is further configured such that the vehicle is able to run in a selected one of the engine drive mode and the motor drive mode. When the vehicle is run in the motor drive mode, the lock-up clutch 38 can be controlled to improve the fuel economy, without having to take account of generation of the booming noise due to the explosion vibrations of the engine 14. When the vehicle is run in the engine drive mode where the vehicle cannot be run in the motor drive mode, the fuel economy is improved by placing the engine connecting/disconnecting clutch K0 in the slipping state during the vehicle starting slip control.

The present embodiment is also configured to set the target value $\Delta N_K'$ of the slipping amount of the engine connecting/disconnecting clutch K0 is set upon implementation of the vehicle starting slip control, and the electric motor MG is controlled to reduce a difference between the target slipping amount value $\Delta N_K'$ and the actual slipping amount value $\Delta N_K$. Accordingly, the engine speed $N_E$ can be controlled as desired for further improving the fuel economy relative to a case using the hydraulic control, by the vehicle starting slip control in the engine drive mode with the engine 14 operated as the vehicle drive power source.

The present embodiment is further configured such that the lock-up clutch 38 and the engine connecting/disconnecting clutch K0 are gradually brought into the fully engaged state after the vehicle starting slip control is initiated, and the lock-up slip control is terminated when one of the lock-up clutch 38 and the engine connecting/disconnecting clutch K0 which is more easily controllable for the full engagement than the other has been brought into the fully engaged state after the other is brought into the fully engaged state. Accordingly, the vehicle starting slip control is adequately implemented to adequately transmit the drive force of the engine 14 to the drive wheels 34. The clutch which is more easily controllable has not yet been brought into the fully engaged state when the clutch which is less easily controllable has been brought into, the fully engaged state, so that the engaging shock of the clutch which is less easily controllable is reduced.

While the embodiment of the present invention has been described above in detail by reference to the drawings, it is to be understood that the invention may be otherwise embodied.

Although the illustrated embodiment is configured such that both of the lock-up clutch 38 and the engine connecting/disconnecting clutch K0 are placed in a slipping state when the vehicle starting slip control is implemented during starting of the vehicle with the engine 14 operated as the vehicle drive power source, the principle of the present invention is applicable to the steady-state slip control, for instance. As described above, this steady-state slip control is implemented within the above-described lock-up slip region, which is set by taking account of the vehicle drivability and the booming noise, for example. Namely, the steady-state slip control is implemented to assure a higher effect of damping of the explosion vibrations of the engine 14 by placing the lock-up clutch 38 in the slipping state, as compared with the effect where the lock-up clutch 38 is placed in the fully engaged state. Accordingly, like the vehicle starting slip control, the steady-state slip control more effectively improves the effect of damping of the explosion vibrations of the engine 14 when the engine connecting/disconnecting clutch K0 is placed in the slipping state, and permits the above-described lock-up slip region to be wider than where the engine connecting/disconnecting clutch K0 is not placed in the slipping state. Accordingly, the present invention applied to the steady-state slip control provides substantially the same advantages as the illustrated embodiment. It is noted that in view of the lock-up slip region determined by heat capacity of the lock-up clutch 38, the slipping actions of both of the lock-up clutch 38 and the engine connecting/disconnecting clutch K0 result in generation of heat by those two clutches and therefore permit the lock-up slip region to be widened.

In the illustrated embodiment, the vehicle 10 is provided with the electric motor MG. However, the provision of the electric motor MG is not essential. Where the electric motor MG is not provided, the present invention is embodied without motor running and/or a control of the slipping amount $\Delta N_K$ using the electric motor MG, also permitting a certain degree of improvement of the fuel economy owing to a wider range of the engine speed in which the slip control can be implemented.

In the illustrated embodiment, hydraulically operated frictional coupling devices such as clutches C and brakes B are used to selectively establish the speed positions of the automatic transmission 18. However, the hydraulically operated frictional coupling devices may be replaced by any other types of coupling devices such as electromagnetic clutches, powder (magnetic powder) clutches, meshing type dog clutches, and any other electromagnetic or magnetic powder type coupling devices. Further, the automatic transmission 18 in the illustrated embodiment, which is arranged to perform automatic shifting actions on the basis of the vehicle running state and according to a shifting map, may be replaced by a manual transmission which is shifted on the basis of only a manual operation by the vehicle operator.

According to the description regarding the illustrated embodiment, the transmission output torque $T_{OUT}$ obtained from the required torque of the vehicle, the transmission input torque $T_{AT}$ or the input torque of the power transmitting system 12 may be used as the required torque of the vehicle, in place of the output torque of the drive wheels 34 obtained from the required vehicle output as calculated from the accelerator pedal operation amount Acc and the vehicle running speed V. However, the required torque of the vehicle may be represented by any other parameters such as the transmission output torque $T_{OUT}$, the transmission input torque $T_{AT}$, etc. as calculated from the engine torque $T_E$ obtained so as to provide the required vehicle output, or may be a torque value detected directly by a torque sensor.

While the torque converter 16 is used as the fluid-operated power transmitting device in the illustrated embodiment, the torque converter 16 may be replaced by any other fluid-operated power transmitting device such as a fluid coupling not having a torque boosting function.

It is to be understood that the foregoing description is provided for illustrative purpose only, and that the present invention may be embodied with various changes and improvements which may occur to those skilled in the art,

NOMENCLATURE OF REFERENCE SIGNS

10: Hybrid vehicle (Vehicle)
14: Engine
16: Torque converter (Fluid-operated power transmitting device)
34: Drive wheels
38: Lock-up clutch
100: Electronic control device (Control device)
K0: Engine connecting/disconnecting clutch
MG: Electric motor

The invention claimed is:

1. A control device of a vehicle provided with an engine, and a fluid-operated power transmitting device provided with a lock-up clutch and configured to transmit a drive force of said engine to drive wheels, and an engine connecting/disconnecting clutch configured to selectively place a power transmitting path between said engine and said fluid-operated power transmitting device in a power transmitting state and a power cutoff state, said vehicle being able to run in an engine drive mode in which said engine is operated as a vehicle drive power source while said engine connecting/disconnecting clutch is placed in a fully engaged state, comprising:
 a lock-up clutch control portion configured to bring said engine connecting/disconnecting clutch from the fully engaged state into a slipping state and temporarily place the engine connecting/disconnecting clutch in the slipping state while said lock-up clutch is placed in a slipping state, when a lock-up slip control is implemented to place said lock-up clutch from a fully released state into the slipping state and gradually bring the lock-up clutch into a fully engaged state, in response to an increase of a required amount of acceleration of said vehicle, during running of the vehicle in said engine drive mode with said engine connecting/disconnecting clutch being placed in the fully engaged state.

2. The control device according to claim 1, wherein said lock-up clutch control portion implements, as said lock-up slip control, a vehicle starting lock-up slip control to place said lock-up clutch in the slipping state during starting of the vehicle with said engine operated as the vehicle drive power source.

3. The control device according to claim 1 wherein the vehicle is further provided with an electric motor connected to a power transmitting path between said engine connecting/disconnecting clutch and said fluid-operated power transmitting device, and the vehicle is able to run in a motor drive mode in which only said electric motor is operated as the vehicle drive power source while said engine connecting/disconnecting clutch is placed in a released state.

4. The control device according to claim 3, wherein said lock-up clutch control portion sets a target value of a slipping amount of said engine connecting/disconnecting clutch upon implementation of said lock-up slip control, and controls said electric motor to reduce a difference between said target value and an actual value of the slipping amount.

5. The control device according to claim 1, wherein said lock-up clutch control portion gradually brings said lock-up clutch and said engine connecting/disconnecting clutch are gradually brought into the fully engaged state after said lock-up slip control is initiated, and said lock-up clutch control portion terminates said lock-up slip control when one of said lock-up clutch and said engine connecting/disconnecting clutch which is more easily controllable for the full engagement than an other has been brought into the fully engaged state after the other is brought into the fully engaged state.

* * * * *